United States Patent Office 2,838,471
Patented June 10, 1958

2,838,471

PREVENTION OF SURFACE CRAZING OF RUBBER-RESIN BLENDS BY AROMATIC POLYAMINES

Dean E. Peterson, Naugatuck, and William F. Brucksch, Jr., Bethany, Conn., assignors to United States Rubber Company, New York, N. Y., a corporation of New Jersey No Drawing. Application May 18, 1954
Serial No. 430,722

2 Claims. (Cl. 260—45.9)

This invention relates to a method of preventing the frosting of the resin-rubber combinations composed of styrene-acrylonitrile resin mixed with butadiene-acrylonitrile rubber. Such blends are patented by Daly 2,439,202 and consists of 50–90% of a resinous copolymer of 50 to 85% by weight of styrene and 50 to 15% by weight of acrylonitrile mixed with 50–10% of a rubbery copolymer of butadiene and acrylonitrile.

It has been observed that the surface of the finished resin as it comes from the molding or calendering machine frequently develops a whitish coating on standing. This coating is most noticeable in dark colored stocks; a black stock may change to a light gray in the course of a surface exposure.

We have found that this bloom can be eliminated by the use of diprimary aryl amines. These amines are particularly effective against blooming. They do cause a measure of discoloration which can be kept at a minimum by the use of lower amounts of the chemicals.

These amines are effective in amounts by weight of 0.1 to 5.0 parts based on 100 parts of the rubber-resin blend. A preferable ratio is 0.2 to 0.8 part.

The polyamine may be incorporated into any stage of the milling or the mixing process or the finished surface may be coated or dipped into an alcohol solution of the polyamine.

In diffuse light the bloom is most pronounced on the surface exposed directly to light. An exposure of one month is sufficient to demonstrate a pronounced difference between a stock which will bloom and a stock which will not bloom. The effect can also be demonstrated by exposure of panels to an atmosphere of ozone for a 48-hour period.

The chemicals of this invention do not adversely affect the physical properties of the blend such as impact resistance, flexural strength, etc. Typical examples include p-phenylenediamine, benzidine, p,p'-diaminodiphenylmethane, o-phenylenediamine, m-phenylenediamine, p,p'-diaminodiphenyldimethylmethane, dianisidine.

Compounds in which the amino groups are not primary groups do not possess this property. Thus tetramethyl diaminodiphenylmethane is of no value.

In place of the free amines it is possible to use salts of the amines such as the hydrochlorides, the sulfates, the oxalates, the phosphates, the maleates.

Primary aromatic amines such as aniline and p-toluidine were found ineffective.

The following examples are given to illustrate the invention, parts being by weight:

Each chemical was tested in two formulations:

A. A stock containing carbon black in which stock the bloom was readily apparent
B. A white stock for observation of discoloration

|  | Black stock |
|---|---|
| Rubber [1] | 30 |
| Resin [2] | 70 |
| Non-discoloring antioxidant | 0.6 |
| Calcium stearate | 0.7 |
| Titanium dioxide | -- |
| Carbon black | 1.0 |
| Chemical | 0.6 |

[1] Butadiene (65) acrylonitrile (35) divinyl benzene copolymer (Romeyn et al. U. S. Patent No. 2,600,024).
[2] Styrene 70, acrylonitrile 30 copolymer.

The chemicals were blended into the rubber on a cold mill and the resin added as a powder on a hot mill at 330° F.

The stocks were aged one month at room temperature.

| Chemical | Amount | Bloom Resistance (Black Stock) |
|---|---|---|
| Diaminodiphenylmethane | 0.1 | Good. |
| Do | 0.5 | Excellent. |
| p-Phenylenediamine | 0.6 | Very good. |
| Benzidine | 0.6 | Do. |
| Benzidine dihydrochloride | 0.6 | Good. |
| Diaminodiphenylmethane hydrochloride | 0.6 | Do. |
| Dianisidine | 0.6 | Do. |

Having thus described our invention, what we claim and desire to protect by Letters Patent is:

1. A polyblend of approximately 50 to 10 percent by weight of a butadiene-acrylonitrile rubbery copolymer and approximately 50 to 90 percent by weight of a styrene-acrylonitrile resinous copolymer containing, by weight, from about 0.1 to 5.0 parts per 100 parts of the polyblend, of a member selected from the group consisting of diprimary aromatic amines and their salts.

2. A polyblend of approximately 50 to 10 percent by weight of a butadiene-acrylonitrile rubbery copolymer and approximately 50 to 90 percent by weight of a styrene-acrylonitrile resinous copolymer containing, by weight, from about 0.1 to 5.0 parts per 100 parts of the polyblend, of diaminodiphenylmethane.

References Cited in the file of this patent

UNITED STATES PATENTS

| 2,550,139 | Daly | Apr. 24, 1951 |
| 2,652,384 | Sayko et al. | Sept. 15, 1953 |
| 2,721,185 | Schulze et al. | Oct. 18, 1955 |

FOREIGN PATENTS

| 71,109 | Netherlands | Nov. 15, 1952 |